United States Patent [19]

Cheng et al.

[11] Patent Number: 4,898,436

[45] Date of Patent: Feb. 6, 1990

[54] SPATIAL LIGHT MODULATION IN COMPOUND SEMICONDUCTOR MATERIALS

[75] Inventors: Li-Jen Cheng, LaCrescenta; Gregory O. Gheen, Pasadena; Afshin Partovi, Los Angeles, all of Calif.

[73] Assignee: The United States of America as represented by the Administrator of the National Aeronautics and Space Administration, Washington, D.C.

[21] Appl. No.: 172,007

[22] Filed: Mar. 23, 1988

[51] Int. Cl.[4] ............... G03H 1/12; G02F 1/35; G02B 27/28

[52] U.S. Cl. ................... 350/3.64; 350/3.85; 350/389; 350/390

[58] Field of Search ............ 350/3.62, 3.64, 3.85, 350/389, 390

[56] References Cited

U.S. PATENT DOCUMENTS 4,761,059  8/1988  Yeh et al. .............. 350/3.64 X
4,767,195  8/1988  Pepper .................. 350/3.62 X Primary Examiner—Bruce Y. Arnold
Assistant Examiner—David J. Edmondson
Attorney, Agent, or Firm—Thomas H. Jones; John R. Manning; Charles E. B. Glenn

[57] ABSTRACT

Spatial light modulation (22) in a III-V single crystal (12), e.g., gallium arsenide, is achieved using the photorefractive effect. Polarization rotation created by beam coupling is utilized in one embodiment. In particular, information (16) on a control beam (14) incident on the crystal is transferred to an input beam (10), also incident on the crystal. An output beam (18) modulated in intensity is obtained by passing the polarization-modulated input beam through a polarizer (20).

10 Claims, 1 Drawing Sheet

$n'_x = n_o + \frac{1}{2} n_o^3 r_{41} E^{SC}$ $n'_y = n_o - \frac{1}{2} n_o^3 r_{41} E^{SC}$ $n'_z = n_o$

SPATIAL LIGHT MODULATION IN COMPOUND SEMICONDUCTOR MATERIALS

The invention described herein was made in the performance of work under a NASA contract, and is subject to the provisions of Public Law 96-517 (35 USC 202) in which the Contractor has elected to retain title.

TECHNICAL FIELD

The present invention relates to spatial light modulation, and, more particularly, to transferring an image carried on one light beam to another light beam where the light beams intersect in a GaAs crystal.

BACKGROUND ART

The availability of high performance spatial light modulators is very critical for the progress in image processing and optical computing. An ideal spatial light modulator should have many advantageous characteristics of performance, such as high sensitivity, fast response, high uniformity, low power consumption, simple fabrication, low cost, and compact size. In addition, it should be compatible to technologies of the light source (i.e. lasers), sensor and VLSI. However, such spatial light modulators do not exist at this moment.

DISCLOSURE OF INVENTION

In accordance with the invention, spatial light modulation in GaAs is disclosed, namely, an image carried by one light beam can be transferred to another beam when they intercept each other in a GaAs crystal. The technique used is a cross polarization beam coupling process, in which two coherent beams with their polarization bisecting the major electro-optic axes intercept each other in the crystal and exchange energy via self-induced index grating created due to the photorefractive effect. During this process, there is no net energy transfer, but the resultant polarization of each beam is rotated due to the fact that energy transfer is polarization-dependent. By using a polarizer, the diffracted beam bearing the image can be separated from the original one. Consequently, the image transfer can be achieved.

Spatial light modulation in GaAs has not previously been demonstrated, and is accordingly a significant step toward the realization of using GaAs crystals for real-time spatial light modulation, one of the critical processes for optical information processing. Because they are based on the same semiconductor materials technology, this provides a potential to integrate optical processing devices with advanced technologies of VLSI and opto-electronics (lasers and sensors) for the development of future versatile, compact, and sophisticated intelligent systems to find use in many technological areas.

BEST MODES FOR CARRYING OUT THE INVENTION

Figure 1A:
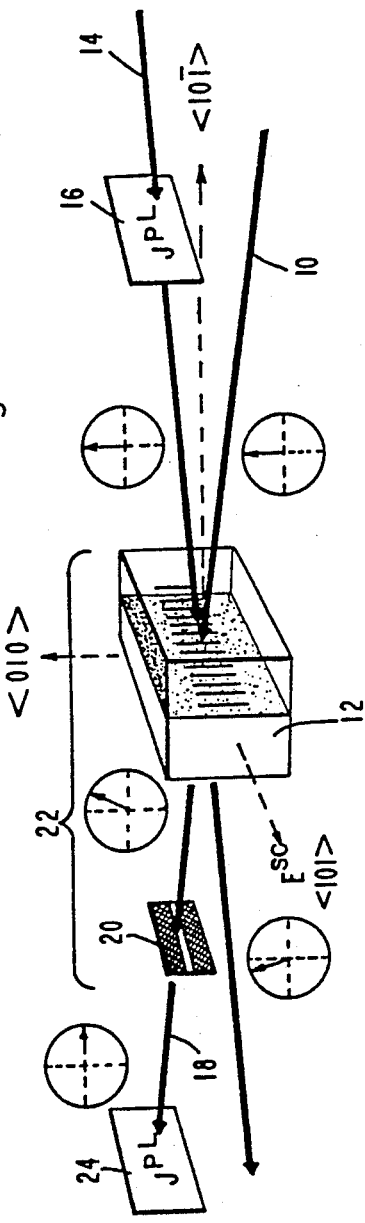
FIG. 1a is an illustration of the experimental setup demonstrating the essential features of spatial light modulation using cross polarization beam coupling configuration in accordance with the invention.

Gallium arsenide (GaAs) and other III-V compound semiconductors, such as InP, and II-VI compound semiconductors, such as CdTe, are potential materials for spatial light modulation. In particular, semi-insulating GaAs is known to be photorefractive. Photorefractive crystals have potential optical processing applications, such as spatial light modulation, holography, beam-steering, convolution and correlation, incoherent-to-coherent light conversion, and so on. These have been demonstrated using conventional oxide materials, such as barium titanate ($BaTiO_3$), bismuth silicon oxide ($Bi_{12}SiO_{20}$), and lithium niobate ($LiNbO_3$). However, the use of GaAS for optical devices has many advantages over those of conventional oxide materials. They include high sensitivity, low power consumption, infrared operation, fast response, tunable information storage time, availability of high quality and large-size crystals, and finally, the most important one, compatibility with semiconductor lasers, sensors, and VLSI technologies. The successful demonstration of spatial light modulation in GaAs disclosed herein is a significant step toward the alization of using GaAs for real-time spatial light modulation, beamsteering, and data transfer.

Gallium arsenide is the most technologically important compound semiconductor for the development of high speed electronics and opto-electronics. In addition, the GaAs crystal is electro-optic. The semi-insulating GaAs crystals are photorefractive and can be used in optical information processes.

This invention concerns the first demonstration of spatial light modulation in GaAs crystals using a cross polarization beam coupling technique. At the present time, the quality of the transferred image is less than optimum, due to equipment limitation, poor crystal quality and other factors. Nevertheless, spatial light modulation using a GaAS crystal has been demonstrated. This establishes the potential of GaAs as an optical processing medium.

The ordinary beam coupling process includes: (1) formation of intensity interference pattern due to the interception of two coherent light beams; (2) creation of a periodic space charge distribution due to net carrier transfer from light regions to the dark regions; (3) generation of a refractive index grating via electro-optic effects due to the electric field associated to the space charge, which is about 90° spatially phase shifted with respect to the interference pattern; (4) diffraction of the beams due to the existence of the grating in which one diffracted beam constructively interferes with the incoming beam and the other is destructively interfered because of the phase shift. This results in a net energy transfer from one beam to the other. The transfer direction depends on the crystal orientation with respect to incident beam and light polarization directions.

The cross polarization beam coupling process of the invention is a special case of the beam coupling process. In this process, the polarizatiion of the incoming beams bisect the two major electro-optical axes and the electric field vector of light can be decomposed into two equal components with each being parallel to one electro-optical axis. Because the refractive index change along the two electro-optic axes are of equal magnitude but opposite sign, the diffracted beam from one component experiences a constructive interference with the incoming beam and that from the other experiences a destructive interference. Consequently, the electric field vector of the resultant diffracted beam is rotated by 90° toward the axes which experiences constructive interference. Then, the diffracted beam can be separated from the original beam by using a polarizer. It should be noted that in the cross polarization beam coupling process, there is no net energy transfer from one to the other.

FIG. 1a illustrates a cross polarization beam coupling configuration used in the demonstration of spatial light modulation in GaAs. One of the beams 10 impinging upon the GaAs crystal 12 is a uniform collimated beam called the input beam. The other beam 14 passes through a transparency 16 containing the letters JPL that is imaged onto the crystal by a lens (not shown). This beam is referred to as the control beam. Both beams are parallel to the x-z plane and polarized in the y direction as defined in FIG. 1b.

Figure 1B:
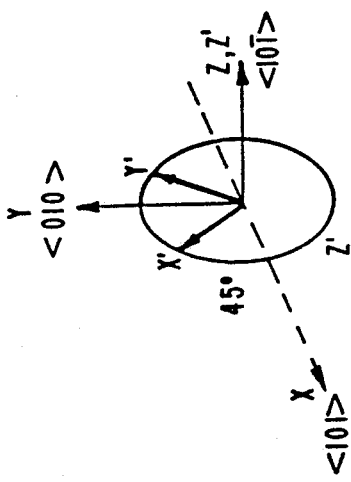
FIG. 1b is a schematic diagram depicting the electro-optic properties of GaAs with space-charge field perpendicular to the (101) plane.

The formation of the interference pattern along the <101> direction results in a modulated space-charge field along the same direction. This in turn results in a modulated refractive index as determined by the electro-optic tensor. The principal axes of this modulated refractive index can be shown to lie along the x' and y' axes, as illustrated in FIG. 1b.

Because the polarization of the light incident upon the crystal 12 bisects the two principal axes, the light can be decomposed into two equal components with polarizations along the x' and y' directions. For x'-polarized light, energy is coupled from the control beam 14 to the input beam 10. For y'-polarized light, energy is coupled from the input beam 10 to the control beam 14.

The net result of these two coupling processes is zero energy transfer; however, the polarizations of the two beams are rotated in opposite directions, since the two coupling processes occurred along different directions of polarization. Thus, the input beam 10 becomes modulated in polarization across its wave front. Areas corresponding to the dark letters JPL have the same polarization as the incident light, since no coupling has occurred. Areas corresponding to the light background will be rotated in polarization, since they have participated in the beam-coupling process.

To obtain an output beam 18 that is modulated in intensity, the polarization-modulated input beam 10 is passed through a polarizer 20. The combination of the single crystal 12 and the polarizer 20 forms the spatial light modulator 22 of the invention. The use of a cross polarizer to convert a two-dimensional polarization-modulated beam into a corresponding intensity-modulated beam is well-known. When the orientation of the polarizer 20 is set perpendicular to the polarization of the incoming beam 10, the incoming beam is completely blocked; and only those areas that were rotated in polarization pass. The result is a positive two-dimensional intensity-modulated beam.

When the polarization is set perpendicular to the light rotated in polarization, the unrotated light passes, and a negative two-dimensional intensity-modulated beam is observed. In practice, the actual setting of the polarizer for the best performance may depend on a number of factors, such as the intensity ratio of two incoming beams and the polarization changes along the beam paths in the system.

A fundamental limitation on the quality of the output image 24 is determined by the angle of intersection between the two beams. Because the beams are not parallel and information is transferred over the thickness of the crystal, the transferred information is smeared in the direction parallel to the plane of intersection. The smear length is given by the projection of the coupling length of the control beam onto the output beam's wave front. Assuming near normal incidence onto the crystal for both beams, the smear length is approximately equal to $D \sin \theta$, where D is the thickness of the crystal and $\theta$ is the angle of intersection in the crystal. Since the crystal must have substantial thickness to ensure adequate coupling, $\theta$ must be small in order to produce good resolution.

An experimental demonstration was performed using the arrangement shown in FIG. 1a. A semi-insulating, liquid-encapsulated Czochralski-grown GaAs crystal with dimensions 5 mm×8 mm×10 mm along the $<10\bar{1}>$, $<101>$, and $<010>$ crystalline directions, respectively, was used for the photorefractive material. Both $(10\bar{1})$ surfaces were polished with the technique commonly used for preparing GaAs integrated-circuit wafers.

The input beam and the control beam had intensities of 10 and 30 mW/cm$^2$, respectively, and were obtained from a 1.5 $\mu$m He-Ne laser. The polarization of the incident beams was parallel to the $<010>$ direction, bisecting the principal electro-optic axes created by the light-induced space-charge field.

A transparency containing the opaque letters JPL was placed in the control beam and imaged onto the GaAs crystal. The angle of intersection between the input and control beams was 13° outside the crystal. For this angle, the measured gain coefficient of the beam coupling was about 0.15/cm, and the calculated resolution about 3.4 lines/mm. A Glan-Thompson polarizer was placed behind the crystal, and the output was projected onto a screen and viewed using an infrared television camera and monitor.

While both positive and negative images were observed, non-uniformities in the results were considered to arise from non-ideal bulk and surface qualities of the GaAs sample and other miscellaneous factors affecting the experiment. However, better-quality images are expected as crystal quality is improved. In addition, improvement in image resolution can be achieved by reducing the angle of intersection between the beams, as discussed above. The resulting decrease in the beam-coupling coefficient can be offset by applying an electric field to the crystal.

INDUSTRIAL APPLICABILITY

The spatial light modulator of the invention is useful in a variety of applications, including image processing and optical computing.

Thus, there has been disclosed a spatial light modulator, using the photorefractive effect in a III-V material and employing beam coupling. Varios changes and modifications of an obvious nature will be readily apparent to one of ordinary skill in this art, and all such changes and modifications are considered to fall within the scope of the invention, as defined by the appended claims.

What is claimed is:

1. Apparatus for transferring information encoded on one beam of electromagnetic radiation to another beam of electromagnetic radiation comprising:
   (a) a spatial light modulator comprising (1) a semi-insulating single crystal of a III-V or II-VI material, said single crystal cleaved to form a slab having a front-major surface and a rear major surface and (2) a polarizer adjacent said rear surface;

(b) means for forming a coherent input beam polarized in a given direction;

(c) means for directing said input beam onto said front major surface of said single crystal to cause diffraction of said beam, said beam passing through said polarizer to form an output beam;

(d) means for forming a coherent control beam which is coherent with said input beam and polarized in a similar direction as said input beam;

(e) means for encoding said control beam with information; and (f) means for directing said encoded control beam onto said front major surface of said single crystal to interact with said input beam within said single crystal to cause said input beam to be modulated in polarization across its wave front, whereby said information encoded on said control beam is transferred to said input beam and whereby said output beam from said polarizer is modulated in intensity.

2. The modulator of claim 1 wherein said output beam is coherent and vertically polarized.

3. The modulator of claim 2 wherein said single crystal comprises GaAs and said slab is oriented parallel to its (110) plane.

4. The modulator of claim 3 wherein said vertical polarization is along the <010> direction of said single crystal.

5. A method for transferring information from a control beam of polarized, coherent electromagnetic radiation incident on a single crystal material to an input beam of polarized, coherent electromagnetic radiation polarized in a similar direction as said control beam and coherent therewith and incident on said single crystal comprising placing said single crystal such that both said beams interact within said single crystal to diffract said input beam and modulate said beam in polarization, said single crystal comprising a III-V or II-VI semiconductor material, said method further comprising placing a polarizer in the path of said polarization-modulated beam to obtain an output beam modulated in intensity.

6. The method of claim 5 wherein said single crystal comprises GaAs.

7. A method for cross-coupling an input beam and a control beam carrying information, both beams of coherent electromagnetic radiation and polarized in a similar direction and incident on the surface of a single crystal comprising a III-V or II-VI semiconductor material, comprising:

(a) forming an intensity interference pattern along a given direction in said crystal due to the interception of said input and control beams;

(b) creating a modulated space-charge field along said given direction, which results in a modulated refractive index;

(c) generating two components of polarization such that energy from one beam is coupled to the other beam along one direction of polarization and energy from said other beam is coupled to said one beam along another direction of polarization to result in a net zero energy transfer and a rotation of the polarization of said two beams in opposite directions such that said input beam is modulated in polarization across its wave front;

(d) passing said polarization-modulated input beam through a polarizer upon its emergence from said single crystal to obtain an output beam that is modulated in intensity; and (e) rotating said polarizer to select rotated light from unrotated light.

8. The method of claim 7 wherein said single crystal comprises GaAs.

9. The method of claim 7 wherein the orientation of said polarizer is set perpendicular to the polarization of said incoming beam to block said incoming beam and permit only those areas rotated by polarization to pass, to produce a positive two-dimensional intensity-modulated beam.

10. The method of claim 7 wherein the orientation of said polarizer is set perpendicular to the light rotated in polarization to block said rotated light and permit unrotated light to pass, to produce a negative two-dimensional intensity-modulated beam.

* * * * *